(12) United States Patent
Delker et al.

(10) Patent No.: US 9,704,202 B1
(45) Date of Patent: Jul. 11, 2017

(54) BLENDING DEVICE-BASED RECOMMENDATIONS

(75) Inventors: Jason R. Delker, Olathe, KS (US); John M. Everson, Leawood, KS (US); Wing K. Lee, Ashburn, VA (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1785 days.

(21) Appl. No.: 12/032,898

(22) Filed: Feb. 18, 2008

(51) Int. Cl.
*G06Q 10/00* (2012.01)
*G06Q 50/00* (2012.01)

(52) U.S. Cl.
CPC .................... *G06Q 50/01* (2013.01)

(58) Field of Classification Search
USPC ..................... 705/1, 319
See application file for complete search history.

(56) References Cited

U.S. PATENT DOCUMENTS

| | | | |
|---|---|---|---|
| 5,710,887 A | 1/1998 | Chelliah et al. | |
| 6,438,579 B1 | 8/2002 | Hosken | |
| 7,359,894 B1* | 4/2008 | Liebman et al. | 707/3 |
| 7,636,779 B2 | 12/2009 | Hayashi et al. | |
| 7,689,452 B2 | 3/2010 | Lam et al. | |
| 8,010,418 B1 | 8/2011 | Lee et al. | |
| 2003/0069685 A1* | 4/2003 | Rudd et al. | 701/200 |
| 2004/0198398 A1 | 10/2004 | Amir et al. | |
| 2004/0203746 A1 | 10/2004 | Knauerhase et al. | |
| 2004/0215793 A1 | 10/2004 | Ryan et al. | |
| 2005/0113107 A1 | 5/2005 | Meunier | |
| 2005/0159968 A1* | 7/2005 | Cozzolino | 705/1 |
| 2005/0198131 A1 | 9/2005 | Appelman et al. | |
| 2005/0256866 A1* | 11/2005 | Lu et al. | 707/5 |
| 2006/0270419 A1* | 11/2006 | Crowley et al. | 455/456.2 |
| 2007/0016476 A1* | 1/2007 | Hoffberg et al. | 705/14 |
| 2007/0060099 A1 | 3/2007 | Ramer et al. | |
| 2007/0094065 A1* | 4/2007 | Wu et al. | 705/9 |
| 2007/0239552 A1 | 10/2007 | Sundaresan | |
| 2008/0046298 A1* | 2/2008 | Ben-Yehuda et al. | 705/6 |
| 2008/0102856 A1 | 5/2008 | Fortescue et al. | |
| 2009/0106040 A1* | 4/2009 | Jones | 705/1 |
| 2009/0249451 A1 | 10/2009 | Su et al. | |

OTHER PUBLICATIONS

Office Action dated Dec. 1, 2009, U.S. Appl. No. 11/617,709, 13 pages.
Office Action dated Jun. 4, 2010, U.S. Appl. No. 11/617,709, 13 pages.
Lee, Wing K., Patent Application entitled, "System and Method for Identifying and Managing Social Circles," filed Dec. 28, 2006, U.S. Appl. No. 11/617,709.

(Continued)

*Primary Examiner* — Gabrielle McCormick

(57) ABSTRACT

A method is provided for blending device-based recommendations. A request is received from a device to recommend a group activity for a plurality of individuals. A plurality of device user profiles is accessed, each device user profile associated with one of the individuals. At least one group activity is recommended based on applying a plurality of rules to the device user profiles. The at least one recommended group activity is output to the device.

20 Claims, 5 Drawing Sheets

(56) References Cited

OTHER PUBLICATIONS

Kautz, Henry, et al., "Referral Web: Combining Social Networks and Collaborative Filtering, An Interactive," Communications of the AMC, Mar. 1997, vol. 40, No. 3, pp. 63-65.
Final Office Action dated Nov. 30, 2010, U.S. Appl. No. 11/617,709.
Advisory Action dated Feb. 23, 2011, U.S. Appl. No. 11/617,709.
Notice of Allowance dated Mar. 28, 2011, U.S. Appl. No. 11/617,709.
Aharony, Nadav, "When Worlds Collide: Impression, Identity, and Trust Management on the Border Between Online and Real-World Interactions," MAS.960: Signals, Truth and Design, Dec. 2007.
Guy, Ido, et al., "Personalized Recommendation of Social Software Items Based on Social Relations," 2009 ACM 978-1-60558-435-5/09/10, IBM Haifa Research Lab, Mt. Carmel, Haifa 31905, Israel.

* cited by examiner

200

| Device User 202 | Recommended Group Activity 204 | Rating 206 | Comment 208 | Time 210 | Distance 212 |
|---|---|---|---|---|---|
| Bob | Italian restaurant | 7 | Excellent | 12-10 | 5 miles |
| Chris | Italian restaurant | 8 | Quick service | 12-10 | 5 miles |
| Bob | Chinese restaurant | 10 | My fav! | 11-8 | 2 miles |
| Chris | Chinese restaurant | 4 | | 11-8 | 2 miles |

| Device User 202 | Degree of Separation 302 | Weight 304 | Recommended Group Activity 204 | Rating 206 | Comment 208 | Time 210 | Distance 212 |
|---|---|---|---|---|---|---|---|
| Ann | 1 (Bob) | 50% | Mexican restaurant | 9 | Recommend highly! | 11-9 | 1 mile |
| | 1 (Chris) | 75% | Mexican restaurant | 6 | OK | 11-9 | 1 mile |

BLENDING DEVICE-BASED RECOMMENDATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When considering the selection of a group activity, a spontaneously formed group of new acquaintances, friends, or coworkers may not be able to efficiently agree upon the group activity due to the number of people involved. For example, various people may respond with negative comments to randomly suggested types of restaurants, leaving the group no closer to a selection than when they began.

SUMMARY

In some embodiments, a method is provided for blending device-based recommendations. A request is received from a device to recommend a group activity for a plurality of individuals. A plurality of device user profiles is accessed, each device user profile associated with one of the individuals. At least one group activity is recommended based on applying a plurality of rules to the device user profiles. The at least one recommended group activity is output to the device.

In some system embodiments, the system includes a communication server, a plurality of rules, a plurality of device user profiles in a data store, and an analysis component. The analysis component is executed on at least one of the device and the communication server. The plurality of rules for recommending group activities is stored on at least one of the device and the communication server. The communication server receives a request from the device to recommend a group activity for a plurality of individuals. The analysis component accesses a plurality of device user profiles, each device user profile associated with one of the individuals. The analysis component also recommends at least one group activity based on applying the rules to the device user profiles. The communication server outputs the at least one recommended group activity to the device.

In some method embodiments, a request is received from a device to recommend a group activity for a plurality of individuals. A plurality of primary device user profiles associated with the individuals are accessed, each primary device user profile associated with one of the individuals. A social circle of secondary device user profiles is accessed, wherein the social circle includes other individuals with whom the individuals communicate via at least one of text messaging, electronic mailing, and image communication. At least one group activity is recommended based on applying a plurality of rules to the primary device user profiles and the secondary device user profiles. The at least one recommended group activity is output to the device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 2 is a block diagram of a portion of a graphic user interface for blending device-based recommendations according to some embodiments of the present disclosure.

FIG. 3 is a block diagram of a portion of another graphic user interface for blending device-based recommendations according to some embodiments of the present disclosure.

DETAILED DESCRIPTION

Figure 1:
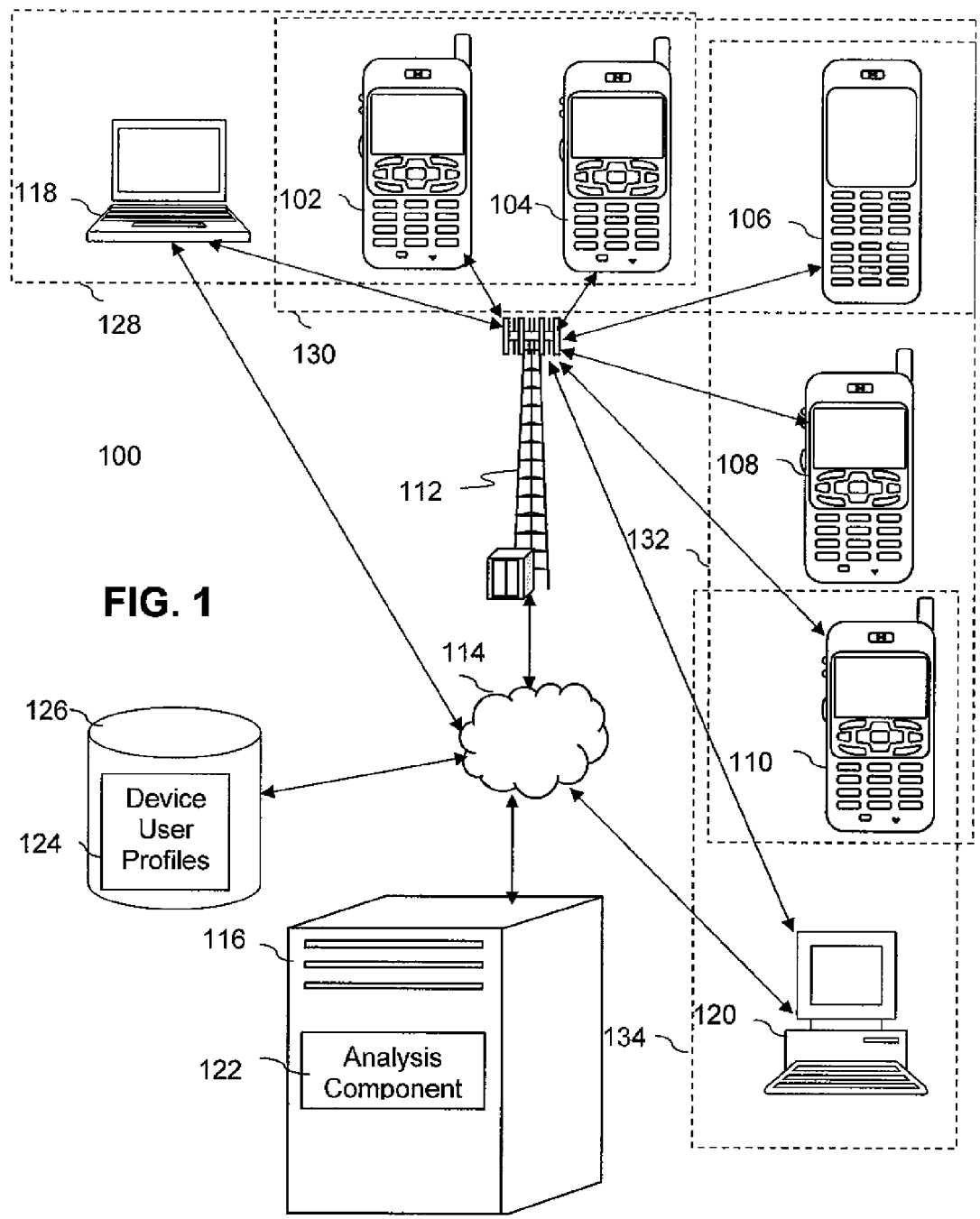
FIG. 1 is a block diagram of a system for blending device-based recommendations according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In an example where a recommendation is needed, none of the people in a discussion may have eaten at a restaurant that is being considered. Many people often turn to family, friends, and co-workers for recommendations to assist with the selection of a group activity. We turn to the people closest to us for recommendations and advice because they are familiar with us and thus will offer recommendations and advice that are likely to be consistent with our own personal tastes, preferences, and lifestyles. However, while their recommendations may be helpful, such advice is not always timely. When looking for a restaurant in which to enjoy a spontaneous lunch out, we need a recommendation on the spot and do not necessarily have time to call family and friends for one.

The Internet offers an alternative, near instantaneous source of information. Using a cellular telephone with Internet service or a laptop computer with wireless Internet connectivity, we may search for and obtain information about recommendations of restaurants located in our general vicinity. A drawback to recommendations and advice obtained in this manner is that with rare exception, those recommendations and advice are provided by those who do not know us, do not know our personal tastes and preferences, and are not familiar with our lifestyles.

The present disclosure provides systems and methods of blending device-based recommendations. The information used as the basis for recommending group activities is information stored for devices associated with the users for whom the recommendation is requested. Upon selecting to request a recommendation for a group activity, a list of group activities is presented on a device's graphic user interface to a device user. The device user may choose a category of group activities from this list, for example, "restaurants," or "movies." In response to this selection, an analysis component accesses recommendations and purchase histories for "restaurants" from the device user profiles for the device user requesting the recommendation and any other designated device users, such as the individuals to be invited to the group activity. The device user profiles may be based on monitored behavior, such as multiple visits to a restaurant or movies downloaded, not just on ratings in response to surveys. The analysis component applies rules to the device user profiles to produce a recommendation that is sent to the device for the group activity that balances the preferences and the dislikes of all the device users involved. The analysis component may take time of day, projected travel time, and travel distance into account when recommending the group activity.

The designated device users may also include any social circle members from which the device user desires to receive "restaurant" recommendations. The analysis component may assign relative weights to recommendations from a device user's social circle based on similarities between a social circle member's ratings and the device user's ratings. Alternatively, the device user may select weights for the recommendations from the device user's social circle members based on the device user's knowledge of the social circle members. The designated device users may even include social circle members for the social circle members of the device users, people who may not be known by the device users. In this way, the device users are provided with recommendations that may have more significance to the device users, because these recommendations are offered by other individuals who the device users know directly or are linked to others the device users know, rather than by strangers who the device users have no knowledge of their personal tastes, preferences, and lifestyle. Moreover, these recommendations may be provided at the same speed recommendations could be retrieved using a typical Internet search engine, and without human intervention.

A telecommunications provider may execute methods for blending device-based recommendations using the illustrative system 100 depicted in FIG. 1. In this embodiment, the system 100 comprises devices 102-110, which may communicate via a base transceiver station 112, a wireless network access node, peer devices 102-110, or any other wireless communication network or system. Although FIG. 1 shows the devices 102-110 communicating via one base transceiver station 112, the devices 102-110 may be located in coverage areas of different base transceiver stations 112 and communicate with each other via a wired network 114 through multiple base transceiver stations 112. The devices 102-110 include a first mobile phone 102, a second mobile phone 104, a personal digital assistant 106, a third mobile phone 108, and a fourth mobile phone 110. The base transceiver station 112 (or wireless network access node) is coupled to a wired network 114, such as the Internet. Via the wireless link and the wired network 114, the devices 102-110 have access to information on various servers, such as a communication server 116. The system may also include devices 118-120, such as a laptop computer 118 and a desktop computer 120, which may communicate through the wired network 114 and/or the base transceiver station 112. The devices 102-110 and 118-120 may be a personal computer, a mobile telecommunication device, a mobile handset, a personal digital assistant, a mobile computer, a handheld gaming device, a wireless mobile device, a pager, a portable computer, a tablet computer, a laptop computer, a digital camera, a digital music player, a set-top box, a desktop computer, or a digital calculator.

Although only one communication server 116 is shown, it is to be understood that multiple communication servers 116 may simultaneously connect to the network 114 in order to distribute the demand placed on the communication servers 116. Such a distribution among multiple communication servers 116 may cause the system 100 to operate faster and more reliably. For instance, even if one communication server 116 fails, other communication servers 116 may remain operational and devices 102-110 and 118-120 may still be able to access the system 100. Similarly, a single laptop computer 118, a single personal digital assistant 106, a single desktop computer 120, and four mobile phones 102-104 and 108-110 are depicted. It is to be understood, however, that any number of mobile phones 102-104 and 108-110, personal digital assistants 106, laptop computers 118, and desktop computers 120 may simultaneously connect to the communication server 116 via the base transceiver station 112 or the network 114 and that each device is intended to represent one or more such devices.

Each of the devices 102-110 and 118-120 includes a display and a touch-sensitive surface or keys for input by a device user. The devices 102-110 and 118-120 may present options for the device users to select, controls for the device users to actuate, and/or cursors or other indicators for the device users to direct. The devices 102-110 and 118-120 may further accept data entry from the device user, including numbers to dial or various parameter values for configuring the operation of the devices 102-110 and 118-120. The devices 102-110 and 118-120 may further execute one or more software or firmware applications in response to device user commands. These applications may configure the devices 102-110 and 118-120 to perform various customized functions in response to device user interaction. The devices 102-110 and 118-120 may execute a web browser application which enables the display to show a web page, from which the device users may request a recommendation for a group activity, specify default rules for recommending group activities, or select a rule for recommending a specific group activity.

A location sensing system may track signals transmitted by the devices 102-110 and 118-120, including the devices 102-110 carried by the device users. The communication server 116 may receive this information from the location sensing system, and may store it in the storage device 126. Using this information, the communication server 116 may determine the proximity of the devices 102-110 and 118-120 to locations associated with group activities.

An analysis component 122 to recommend a group activity may be executed on the communication server 116 and have access through the network 114 to device user profiles 124 stored on a storage device 126. Although FIG. 1 illustrates the analysis component 122 as located on the communication server 116, the analysis component may also be located on one or more of the devices 102-110 and 118-120, the storage device 126, or any combination thereof. Although FIG. 1 illustrates the communication server 116 and the storage device 126 separately, the capabilities of the storage device 126 may be combined with the communication server 116.

The device user profiles 124 may be based on items used, items owned, locations visited, survey responses, rated items, explicit selections, purchases, demographic information, and/or comments. For example, the device user profile for the first mobile phone 102 may indicate that the device user has requested user-customized news updates, has viewed many sports-related websites, has watched mobile-device formatted comedy television shows, has listened to a popular streaming audio talk show, has downloaded popular music ring tones, has purchased a digital video disc of an action film from a website, and has indicated in an electronic survey a preference for mystery novels. In another example, the device user profile may indicate that the device user has visited a website to rate an Italian restaurant with 9 stars out of 10, has added a text comment to a web log that the service at the Italian restaurant is excellent, has explicitly selected in a text message to inform friends of the user's allergy to seafood, and that the first mobile phone 102 has been geographically located at 7 different restaurants in the past week. In yet another example, the device user profile may indicate demographic information about the device user, such as income level, credit score, education level, marital status, number of children, type of residence, job sector, subscriber billing information, and other information that may be used to infer a recommendation for a group activity.

A rating may function as an explicit recommendation, while a purchase history may function as an implied recommendation. For example, if a device user has purchased meals at a specific Italian restaurant ten times during the last year with an electronic credit card on the device user's mobile phone, the analysis component 122 may use this purchase history to infer a recommendation. In another example, if a location sensing system determines that a device has been at a specific Italian restaurant for more than one hour on ten occasions during the last year, the analysis component 122 may use this location history to infer a recommendation. A device user may elect that both the device user's own recommendations and purchasing history be provided to others. The device user may elect that the device user's own recommendations, but not purchase history, be provided to others, or vice versa. Also, the recommendations may be provided, in this embodiment, either anonymously or in association with the device user's identity by selecting an appropriate option from a menu displayed by the user's device. Moreover, the device user may change preferences at will by accessing the menu displayed by the user's device. Further, the device user may have different preferences for different people. For example, the device user may be willing to share restaurant recommendations with everyone in the device user's family, but not with co-workers.

Such options may allow for control of categories of group activity recommendations, a purchase history the device user receives from particular members of a device user's social circle, and so on. It should be appreciated that the present disclosure and examples are intended to be illustrative. Other options and features will readily suggest themselves to one skilled in the art in light of the present disclosure.

The storage device 126 may also store a social circle defined by the telecommunications provider for each user of the devices 102-110 and 118-120. To define a device user's social circle, the telecommunications provider may monitor the contacts that any device user makes using the devices 102-110 and 118-120 for text messaging, electronic mailing, and image communication. For each member of any device user's social circle, information including recommendations and purchasing history for group activities, may be stored in the storage device 126.

The communication server 116 implements methods for blending device-based recommendations. Through its connection to the wired network 114, the communication server 116 provides a means for any device user to access and execute the analysis component 122 and to receive information retrieved by the analysis component 122 from the storage device 126. The analysis component 122 also uses location information associated with the devices 102-110 and 118-120 to recommend group activities.

The system 100 may group the devices 102-110 and 118-120 into social circles 128-134 based on the communication server 116 monitoring communications between devices 102-110 and 118-120 or social circle selections made by the device users. The communications may include text messaging, electronic mailing, and image communication. For example, in response to monitoring e-mails sent by the first mobile phone 102 to the second mobile phone 104 and to the laptop computer 118, the communication server 116 assigns the first mobile phone 102, the second mobile phone 104 and the laptop computer 118 to the first social circle 128, which is associated with the first mobile phone 102. In another example, the user of the second mobile phone 104 selects to add the first mobile phone 102 and the personal digital assistant 106 to the second social circle 130, which is associated with the second mobile phone 104, which may assist the user of the second mobile phone 104 to quickly select the first mobile phone 102 and the personal digital assistant 106 for sending text messages. In yet another example, the user of the second mobile phone 104 may add other users to the second social circle 130 by identifying the other users by numbers associated with their devices, addresses associated with their devices, or their names, even if the user of the second mobile phone 104 does not communicate with these other users via their devices.

In yet another example, in response to monitoring digital photos sent by the personal digital assistant 106 to the third mobile phone 108 and to the fourth mobile phone 110, the communication server 116 assigns the personal digital assistant 106, the third mobile phone 108 and the fourth mobile phone 110 to the third social circle 132, which is associated with the personal digital assistant 106. In one more example, the user of the fourth mobile phone 110 selects to add the desktop computer 120 to the fourth social circle 134, which is associated with the fourth mobile phone 110, which may assist the user of the fourth mobile phone 110 to quickly select the desktop computer 120 for sending videos.

As communication patterns change over time, the communication server 116 may periodically add new devices to a social circle associated with a device and remove some devices from the social circle list. The communication server may automatically add devices to a social circle and remove devices from the social circle, or the device user may have the option to confirm before devices are added or removed from the social circle. Furthermore, a device user may initiate the addition and removal of devices to the device user's social circle. Recommendations and purchases of products and services made by members of a device user's social circle may also be stored on the storage device 126 as part of the social circle system.

Upon requesting a recommendation for a group activity, a device user may be presented with a graphic user interface (GUI), such as the GUI 200 illustrated by FIG. 2. For example, the system 100 may display the GUI 200 to Bob's first mobile phone 102 and possibly to Chris' second mobile phone 104 in response to Bob's request for a restaurant recommendation intended for Bob and Chris. The GUI 200 includes columns for each of a device user 202, a recommended group activity 204, a rating 206, a comment 208, a time 210, and a distance 212. The GUI 200 also includes rows 214-220 that include recommendation information. For example, the row 214 includes recommendation information that Bob has associated with an Italian restaurant, including a rating of 7 and a comment of "excellent." The row 214 also indicates that the restaurant is open between the time of 12 noon and 10 p.m., and that the restaurant is located a distance of 5 miles from the current location of Bob's device. Although not depicted in FIG. 2, the GUI 200 may also display estimated wait times if the communication server 116 is in communication with the recommended restaurant. The row 216 includes recommendation information that Chris has associated with the same Italian restaurant. The row 218 includes recommendation information that Bob has associated with a Chinese restaurant. The row 220 includes recommendation information that Chris has associated with the same Chinese restaurant.

Upon requesting a recommendation for a group activity, a device user may be presented with a graphic user interface (GUI), such as the GUI 300 illustrated by FIG. 3. For example, the system 100 may display the GUI 300 to Bob and Chris in response to Bob's request for a restaurant recommendation intended for Bob and Chris when Bob and Chris are in a city where neither has eaten at a restaurant. The GUI 300 includes the columns depicted in the GUI 200, as well as a column for each of a degree of separation 302 and a weight 304. The GUI 300 also includes rows 306-308 that include recommendation information. For example, the row 306 includes recommendation information that Ann has associated with a Mexican restaurant. Note that the device user column of row 308 may be blank upon request to withhold a social circle member's name. The degree of separation 302 column indicates that Ann has one degree of separation from Bob, which means that Ann is in Bob's social circle. The weight 304 column indicates that in relation to Bob's recommendations, Ann's recommendations have 50% of the weight of Bob's own recommendations. The analysis component 122 may have assigned the weight of 50% to Ann's recommendations in relation to Bob's recommendations based on a comparison of the device user profiles associated with Ann and Bob, or Bob may have selected the weight of 50% for Ann's recommendations.

The analysis component 122 may have assigned the weight of 75% to Donna's restaurant recommendations in relation to Chris' recommendations because the location histories of Chris' second mobile phone 104 and Donna's personal digital assistant 106. The histories may indicate that the second mobile phone 104 and the personal digital assistant 106 both have been located at the same restaurant for the same time for more than one hour on ten occasions during the last year. Although FIG. 3 depicts the weight 304 column as a means to convey the relationship between a social circle member's recommendations and a device user's recommendations, other means are possible, such as color coding recommendation information from green to indicate a high degree of similarity all the way to red to indicate a low degree of similarity. The row 308 may not display a name in the device user 202 column due to a request by Donna, the device user associated with the recommendation information, to remain anonymous.

Figure 4:
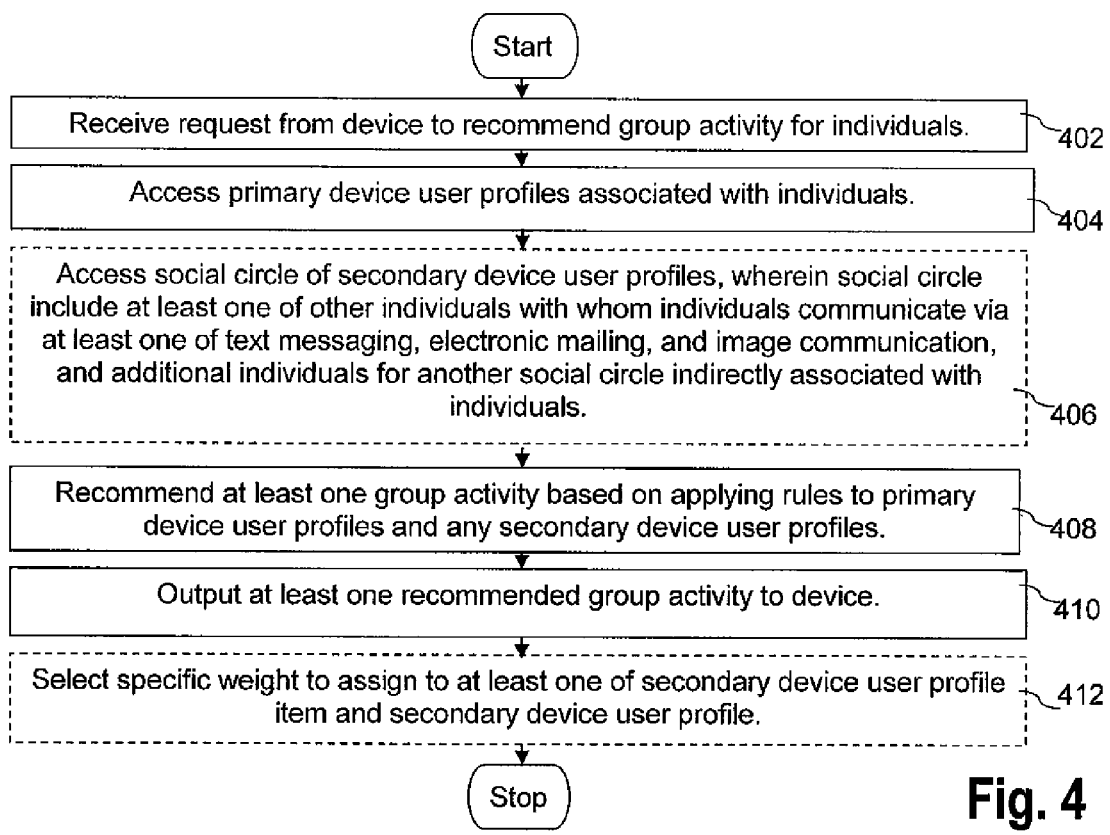
FIG. 4 is a flowchart of a method for blending device-based recommendations according to some embodiments of the present disclosure.

FIG. 4 is a flowchart illustrating a method for blending device-based recommendations according to some embodiments of the present disclosure. The method may be used to receive requests for recommending a group activity and to recommend the group activity based on applying rules to device user profiles.

In box 402, a request is received from a device to recommend a group activity for a plurality of individuals. For example, the analysis component 122 in the communication server 116 receives a request from the first mobile phone 102 to recommend a restaurant for Bob, the user of the first mobile phone 102, and Chris, the user of the second mobile phone 104. The individuals for whom the recommendation is requested may be identified by a Bluetooth interface, a wireless personal area network, or an IEEE 802.11 compliant wireless interface. For example, when making the request, the first mobile phone 102 may use a Bluetooth interface to detect the presence of the second mobile phone 104. Alternatively, a user of a device may explicitly identify the individuals for whom the recommendation is requested. For example, Bob may use the first mobile phone 102 to identify Chris by selecting Chris' name, selecting the number used to call Chris on the second mobile phone 104, or selecting any other unique identifier associated with Chris. When making the request, Bob may also select from a group activity list displayed by the first mobile phone 102, where the list includes a restaurant, a motion picture, a social establishment, musical content, a digital video disc available for renting, a concert, a theatrical play, an opera, a recreational park, and an outdoors activity location. As another example, Bob and Chris may be considering a movie and find it helpful to know if any members of their social circles recently made an online purchase of tickets to a particular movie or that any member recommended the movie.

Alternatively, the device user may choose "other" if a desired group activity does not appear on the list. In this case, a text box may appear in a pop-up window permitting the device user to enter a descriptor for the group activity for which recommendations are to be requested. Upon receiving the descriptor, the analysis component 122 is configured to search the storage device 126 for recommendations associated with the descriptor. If the information sought is found in the storage device 126, the analysis component 122 is configured to pull the information to analyze for a recommendation. Otherwise, the analysis component 122 is configured to transmit a message indicating that no recommendations relating to the descriptor were found. The user requesting the recommendation for which no match was found has the option of creating a new category of a group activity for the unmatched request, which may be used for future requests.

The request may specify a degree of separation for secondary device user profiles, wherein the degree of separation is a fewest number of social circles required to traverse from any of the primary device user profiles to the secondary device user profiles. A primary device user profile is associated with a device user whose recommendation information is accessed and for whom the recommendation is requested, whereas a secondary device user profile is associated with any other device users whose recommendation information is accessed. For example, because the laptop computer 118 and the second mobile phone 104 are both in the first social circle 128 associated with the first mobile phone 102, both the laptop computer 118 and the second mobile phone 104 are one degree of separation from the first mobile phone 102. Therefore, the device user profiles associated with the laptop computer 118 and the second mobile phone 104 are one degree of separation from the device user profile associated with the first mobile phone 102. If the device user does not want any recommendations from the device's social circle to be used by the analysis component 122 in recommending the group activity, the device user may specify zero degrees of separation. Specifying zero degrees of separation would result in using only the device user profiles associated with the device users identified to participate in the group activity. In another example, the personal digital assistant 106 is one degree of separation from the second mobile phone 104 because both the personal digital assistant 106 and the second mobile phone 104 are in the second social circle 130.

The personal digital assistant 106 is two degrees of separation from the first mobile phone 102 because the personal digital assistant 106 is not in the first social circle 128 associated with the first mobile phone 102, but in the second social circle 130 which is associated with the second mobile phone 104, which is in the first social circle 128 associated with the first mobile phone 102. However, if Bob specifies one degree of separation for secondary device user profiles, the device user profile associated with the personal digital assistant 106 is used because the personal digital assistant 106 is one degree of separation from the second mobile phone 104 for which the recommendation is requested. Similarly, the device user profile 124 associated with the laptop computer 118 is used because the laptop computer 118 is one degree of separation from the first mobile phone 102 for which the recommendation is requested. However the device user profile 124 associated with the third mobile phone 108 is not used because the third mobile phone 108 is not within one degree of separation from either the first mobile phone 102 or the second mobile phone 104, for which the recommendation is requested. The fourth mobile phone 110 is also two degrees of separation from the second mobile phone 104, whereas the desktop computer 120 is three degrees of separation from the second mobile phone 104.

In box 404, primary device user profiles are accessed, where each primary device user profile is associated with one of the individuals. For example, the analysis component 122 accesses the device user profiles 124 associated with the first mobile phone 102 and the second mobile phone 104, which are associated with Bob and Chris, respectively. The device user profiles 124 associated with the first mobile phone 102 may include a device user profile associated with Bob via the first mobile phone 102 and a device user profile associated via other devices that are associated with Bob, such as a social network profile normally updated via Bob's personal computer and a device user profile associated with Bob's personal digital assistant, which are not shown in FIG. 1. The analysis component 122 may access the device user profiles 124 based on a selection by each device user, a presence detected for each device user, an invitation accepted by each device user, a communication between each device, and/or a membership in a social circle. For example, Bob and Chris may each select to request a restaurant recommendation and identify each other in their requests. In another example, the analysis component 122 may analyze the locations of the first mobile phone 102 and the second mobile phone 104 as sufficiently close to each other when the first mobile phone 102 requests a restaurant recommendation for the two device users. In yet another example, Bob may send an invitation to Chris via the mobile phones 102-104 when requesting the restaurant recommendation, and the analysis component 122 accesses the device user profile associated with Chris in response to Chris accepting the invitation via the second mobile phone 104.

In an additional example, the analysis component 122 may access the device user profiles associated with the second mobile phone 104 and the first mobile phone 102 because the second mobile phone 104 is in communication with the first mobile phone 102, which requested the restaurant recommendation for the first mobile phone 102 and the second mobile phone 104. In one more example, the analysis component 122 may access the device user profile associated with the second mobile phone 104 because the second mobile phone 104 is in the first social circle 128 associated with the first mobile phone 102, which requested the restaurant recommendation for the first mobile phone 102 and the second mobile phone 104.

In box 406, a social circle of secondary device user profiles is optionally accessed, wherein the social circle includes at least other individuals with whom the individuals communicate via at least one of text messaging, electronic mailing, and image communication, and additional individuals for another social circle indirectly associated with the individuals. For example, the analysis component 122 accesses the device user profiles 124 associated with the first social circle 128 and the second social circle 130, wherein the social circles 128-130 include the laptop computer 118 and the personal digital assistant 106 with whom the first mobile phone 102 and the second mobile phone 104 communicate, respectively. The analysis component 122 may access the device user profiles 124 associated with social circles because the request for the recommendation explicitly requested social circle recommendations within specified degrees of separation. The analysis component 122 may also access the device user profiles 124 associated with social circles because the analysis component 122 accessed insufficient data in the device user profiles 124 for the primary devices, the first mobile phone 102 and the second mobile phone 104, to recommend the group activity.

The secondary device user profiles may include device user profiles for a social circle directly associated with the device users and device user profiles for a social circle indirectly associated with the device users. For example, when the analysis component 122 is unable to recommend the group activity based on the device user profiles 124 used, the analysis component 122 may broaden the search to include extended social circles. This may occur when the device users are searching for a restaurant while on a business trip in a new city or country. The members of the social circles of each member of the device user's social circle may be thought of as being two degrees or relationships separated from the device users, i.e. part of the device users' indirect social circles, just further removed. Although these other individuals are two degrees of separation from the members of the device users' social circles, they may still provide more similar or preferable recommendations or suggestions than the recommendations of those completely unrelated to the device users. Thus, when no recommendations are available from the immediate social circles, the device users may select to extend the search to two, three, or perhaps more degrees of separation to obtain recommendations.

In box 408, at least one group activity is recommended based on applying a plurality of rules to the primary device user profiles and any secondary device user profiles. For example, the analysis component 122 recommends a Mexican restaurant based on applying rules to the device user profiles 124 associated with the mobile phone 102-104 and to the device user profiles 124 associated with the laptop computer 118 and the personal digital assistant 106. The analysis component 122 may apply the rules to the device user profiles 124 associated with the laptop computer 118 and the personal digital assistant 106 because applying the rules to the device user profiles 124 associated with the mobile phone 102-104 did not produce a recommendation, such as when Bob and Chris are dining in an unfamiliar city that is familiar to Ann and Donna, the users of the laptop computer 118 and the personal digital assistant 106.

The recommended group activity may be inferred from the device user profiles when the device user profiles do not include explicit recommendations for the recommended group activity. For example, Bob and Chris may request a recommendation for a Mexican restaurant within 10 miles, but the device user profiles for Bob, Chris, and their social circles may not include any recommendations for Mexican restaurants within 10 miles of their current location. In this situation, the analysis component 122 may identify any other device user profiles that have similar restaurant ratings to the restaurant ratings in the device user profiles for Bob and Chris. If any of these other device user profiles include similar ratings for Mexican restaurants within 10 miles of Bob and Chris' current location, the analysis component 122 may infer that Bob and Chris may rate these nearby Mexican restaurants similarly, and recommend a Mexican restaurant based on these other device user profiles.

The recommended group activity may be associated with a negative rating for a selected number of the device user profiles. For example, if no restaurant within 10 miles is associated with a positive rating by all twelve people who are planning to go to lunch, a device user may revise the request to return a recommendation that is associated with a positive rating for eleven of the twelve device user profiles accessed by the analysis component 122. The analysis component 122 may eliminate an alternative group activity based on an explicit selection associated with at least one of the device user profiles. For example, when Ann, Bob, Chris, and Donna have requested a recommendation for a restaurant, Donna's device user profile identifies her as a vegetarian, which eliminates the possible selection of the steak restaurants rated highly by Bob.

The recommended group activity may be further based on constraints specified by the device users. For example, Bob may include a limit of $10 with the request for a restaurant recommendation, which results in the analysis component 122 recommending only restaurants with estimated costs of less than $10 per person. In another example, Bob may include a "comedy film" constraint with the request for a movie recommendation, which results in the analysis component 122 recommending only movies that are categorized as comedies. The recommended group activity may be recommended based on times associated with the recommended group activities and proximities between devices associated with the individuals and locations associated with the recommended group activities. For example, the GUI 200 may depict the two restaurants that are recommended in response to a request for restaurants that are open after 7 p.m. and are within 5 miles of the mobile phones 102-104.

The analysis component 122 may apply the rules to the device user profiles by assigning more weight for positive device user profile evaluations than for negative device user profile evaluations. For example, if the request for a restaurant recommendation for twelve people produces only recommended restaurants that none in the group either likes or dislikes, the requesting device user may revise the request by instructing the analysis component 122 to assign more weight to positive ratings than to negative ratings. More weight on positive ratings may result in a recommendation that pleases most of the twelve people. The analysis component 122 may apply the rules to the device user profiles 124 by assigning more weight for device user profile evaluations associated with a current timeframe than for device user profile evaluations associated with a previous timeframe. For example, the analysis component 122 assigns more weight to recent evaluations, such that recommendations may favor restaurants recently sampled by the group members. The analysis component 122 may apply the rules to the device user profiles 124 by assigning more weight to extreme ratings than to neutral ratings. For example, if the request for a restaurant recommendation for twelve people or devices produces only recommended restaurants that all in the group rate as neutral, the requesting device user may revise the request by instructing the analysis component 122 to assign more weight to extreme ratings than to neutral ratings. More weight on extreme ratings may result in recommendations that some of the twelve people rate extremely high and none of the twelve people rate extremely low.

The analysis component 122 may compare a secondary device user profile to a primary device user profile to determine a weight for the secondary device user profile. For example, the analysis component 122 assigns a weight of 75% to Donna's recommendations in relation to Chris' recommendations because a comparison of restaurants rated by both Donna and Chris indicates a high degree of similarity. The analysis component 122 may indirectly compare a secondary device user profile to a primary device user profile to determine a weight for the secondary device user profile. For example, while Ed and Chris have not rated the same restaurants, Ed's ratings are similar to Donna's ratings for the restaurants where both Ed and Donna have eaten, and Donna's ratings are similar to Chris' ratings for the restaurants where both Donna and Chris have eaten, which results in assigning a weight of 65% to Ed's recommendations when recommending a restaurant for Chris. The analysis component 122 may weight a secondary device user profile based on an associated degree of separation, wherein the degree of separation is a number of social circles required to traverse from any of the primary plurality of device user profiles to the secondary device user profile. For example, the analysis component may default a weight of 75% to all device users that are one degree of separation from Chris, a weight of 50% to all device users that are two degrees of separation from Chris, and a weight of 25% to all device users that are three degrees of separation from Chris.

In box 410, the at least one recommended group activity is output to the device. For example, the communication server 116 outputs the recommended Mexican restaurant information depicted in FIG. 3 to the first mobile phone 102, and also to the second mobile phone 104. The communication server 116 may output identifying information associated with the primary device user profiles and the secondary device user profiles used for recommending the group activity. For example, the row 306 indicates that the recommendation information for the Mexican restaurant is associated with Ann, who is in Bob's social circle, as indicated by "1 (Bob)" in the degree of separation 302 column. However, some device users may not want their name displayed with their recommendation information or purchase history. For example, a device user may want to share recommendations for a specific restaurant, but may not want to share information that indicates every motion picture showing that the device user attended. Therefore, the example depicted in row 308 indicates that the recommendation information for the Mexican restaurant is associated with somebody who is in Chris' social circle, as indicated by "1 (Chris)" in the degree of separation 302 column, but the GUI 300 does not identify that individual.

Upon receipt of the recommendation, a device user may identify the device users for whom the recommendation was requested as a specific group for subsequent similar recommendations. For example, Bob may identify the recommendation of the Mexican restaurant for Bob and Chris as made for a "Bob and Chris' lunch group." Bob may select the "Bob and Chris' lunch group" to subsequently request recommendations without having to identify each member of the group individually. In response to the identification of such a group and the identification of a date and time associated with the group, the system 100 may prompt device users with unsolicited recommendations, treating the identification of the group as an implicit request for a recommendation. For example, if Bob and Chris request restaurant recommendations at 11:00 A.M. on the first two Tuesdays of a month, the system 100 may anticipate another similar request by outputting restaurant recommendations for Bob and Chris at 11:00 A.M. on the third Tuesday of the month.

A device user may control the flow of the device user's information for each device associated with the user, including recommendations, purchase history, and name to others who include the device user as a member of their social circles. For example, the device user's information may include information associated with the user's mobile phone, portable gaming device, laptop computer, and personal computer. Those who may identify the device user as a member of their social circle include other device users using the same telecommunications provider as the device user and those using a different telecommunications provider, that provider maintaining a similar social circle system which is configured to be compatible with, i.e. able to provide information to and receive information from, the social circle system maintaining the device user's social circle. This allows, for example, a device user of one telecommunication company to exchange information with a device user of another telecommunication company who includes the former as a member of the latter's social circle. Moreover, an Internet service provider may also be configured to maintain device user social circles and allow the exchange of information between their device users and device users of a specific telecommunications provider.

In box 412, a specific weight is optionally selected to assign to at least one of a secondary device user profile item and a secondary device user profile. For example, Bob selects a weight of 50% to assign to Ann's recommendations for restaurants. In another example, Chris assigns a weight of 75% to assign to all of Donna's recommendations, regardless of the group activity category.

The device users may also associate various categories of group activities with members of the social circle, thereby limiting or restricting the type of recommendations and purchase history received from a member of a social circle to particular categories of group activities. For example, because a device user may have gone to many restaurants with coworkers and become familiar with the degree to which their tastes match the device user's tastes, the device user may elect to receive recommendations and purchase history from coworkers regarding only "restaurants", but not "motion pictures" or "music", by associating the coworkers with "restaurants." As another example, the device user may elect to receive recommendations and purchase history regarding music only from specific friends by associating "music" with those friends.

Whatever selection the device user makes from the list of group activities, the analysis component 122 is configured to pull recommendations only from members of the social circle that the device user has selected to be associated with that particular group activity. For example, if the device user selects "restaurants" from the list, the analysis component 122 is configured to pull "restaurant" recommendations only from members of the device users' social circles that the device users have associated with "restaurants."

Figure 5:
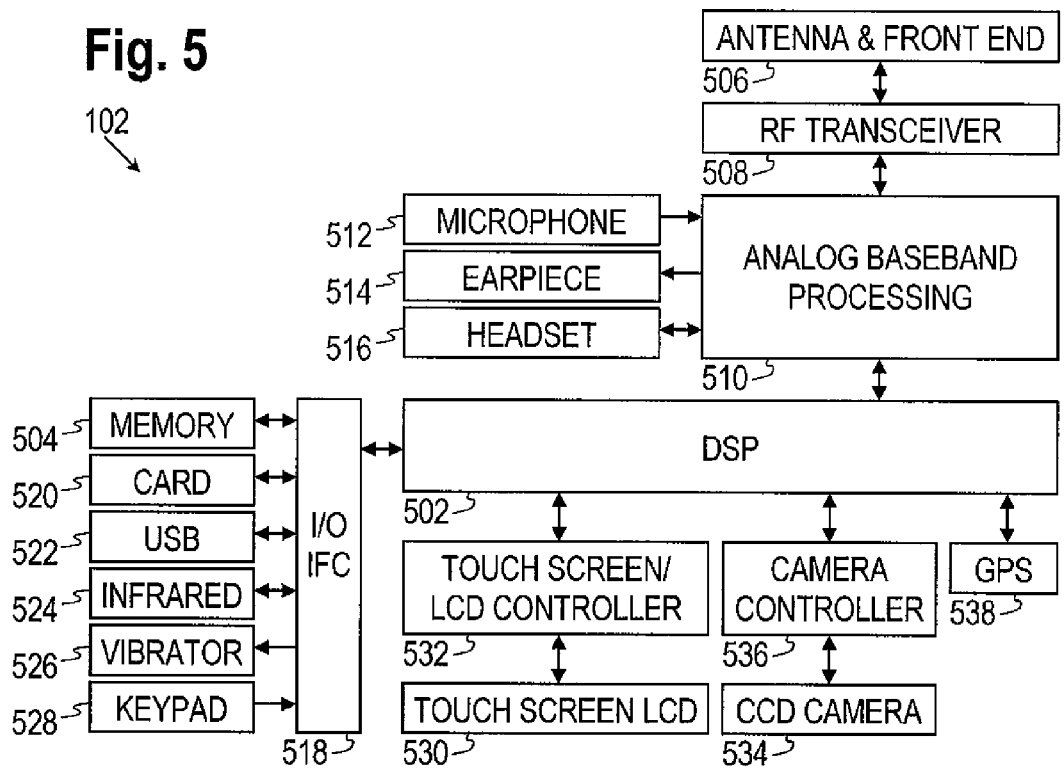
FIG. 5 shows a block diagram of an illustrative mobile device.

FIG. 5 shows a block diagram of the first mobile phone 102. Although depicted as a mobile phone, the components in FIG. 5 may be included in a mobile device, such as the personal digital assistant 106 or the laptop computer 118. While a variety of known components of the first mobile phone 102 are depicted, in an embodiment a subset of the listed components and/or additional components not listed may be included in the first mobile phone 102. The first mobile phone 102 includes a digital signal processor (DSP) 502 and a memory 504. As shown, the first mobile phone 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the first mobile phone 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the first mobile phone 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the first mobile phone 102 to send and receive information from a cellular network or some other available wireless communications network or from a peer second mobile phone 104. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending, and for a receiver function the DSP 502 may perform cyclic prefix removal, fast fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the first mobile phone 102 to function as a peripheral device to exchange information with a personal computer or other computer system. The infrared port 524 and other optional ports such as a Bluetooth interface or an IEEE 802.11 compliant wireless interface may enable the first mobile phone 102 to communicate wirelessly with other nearby mobile devices and/or wireless base stations.

The input/output interface 518 may further connect the DSP 502 to the vibrator 526 that, when triggered, causes the first mobile phone 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the first mobile phone 102. Another input mechanism may be the touch screen LCD 530, which may also display text and/or graphics to the user. The touch screen LCD controller 532 couples the DSP 502 to the touch screen LCD 530.

The CCD camera 534 enables the first mobile phone 102 to take digital pictures. The DSP 502 communicates with the CCD camera 534 via the camera controller 536. The GPS sensor 538 is coupled to the DSP 502 to decode global positioning system signals, thereby enabling the first mobile phone 102 to determine its position. In another embodiment, a camera operating according to a technology other than Charge Coupled Device cameras may be employed. Various other peripherals may also be included to provide additional functions, e.g., radio and television reception.

Figure 6:
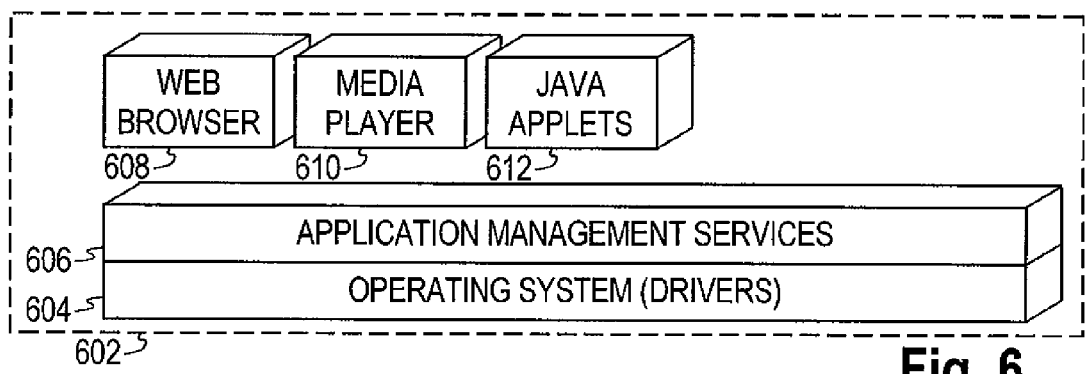
FIG. 6 shows a block diagram of an illustrative software configuration for a mobile device.

FIG. 6 illustrates a software environment 602 that may be implemented by the DSP 502. Although depicted as a mobile phone, the software environment 602 in FIG. 6 may be included in a mobile device, such as the personal digital assistant 106 or the laptop computer 118. The DSP 502 executes operating system drivers 604 that provide a platform from which the rest of the software operates. The operating system drivers 604 provide drivers for the mobile device hardware with standardized interfaces that are accessible to application software. The operating system drivers 604 include application management services ("AMS") 606 that transfer control between applications running on the first mobile phone 102. Also shown in FIG. 6 are a web browser application 608, a media player application 610, and JAVA applets 612. The web browser application 608 configures the first mobile phone 102 to operate as a web browser, allowing a user to enter information into forms and select links to retrieve and view web pages. The media player application 610 configures the first mobile phone 102 to retrieve and play audio or audiovisual media. The JAVA applets 612 configure the first mobile phone 102 to provide games, utilities, and other functionality.

Figure 7:
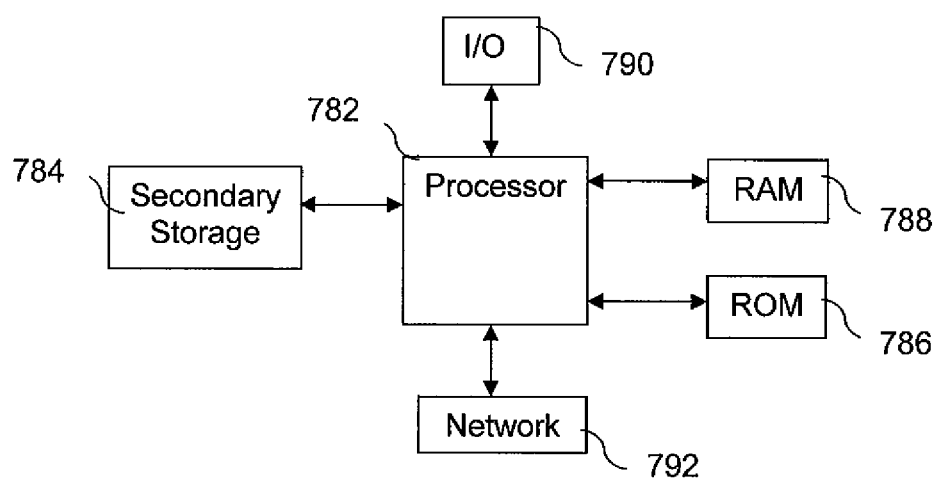
FIG. 7 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 792 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for blending device-based recommendations, comprising:

a data store of a telecommunications provider comprising a non-transitory memory storing a plurality of device user profiles, each device user profile associated with one of a plurality of mobile devices that each correspond with an individual user, wherein the device user profiles include at least one explicit group activity recommendation and information capable of being analyzed to determine an implicit group activity recommendation; and a communication server communicatively coupled to the data store and the plurality of mobile devices via a network of the telecommunications provider, the communication server comprising a processor coupled to a non-transitory memory storing a plurality of rules and an analysis component that, upon execution by the processor, configures the communication server to:

monitor communications sent and received by the plurality of mobile devices, wherein communications being monitored include text messaging, electronic mailing, and digital image communication sent on the network of telecommunication provider, group each of the plurality of mobile devices into one or more social circles of a plurality of social circles based on the monitored communications, receive a request from a mobile device to recommend a group activity for a plurality of individuals corresponding to a subset of the plurality of mobile devices identified in the request, wherein the request identifies a category of group activities for the group activity, and wherein at least one mobile device of the subset identified in the request is detected by the mobile device via a short range wireless interface on the mobile device, identify a subset of the plurality of social circles to which any of the subset of the plurality of mobile devices belongs, wherein the subset of the plurality of social circles includes one or more mobile devices that are not part of the subset of the plurality of mobile devices identified in the request but are within a degree of separation specified in the request for device user profiles in the data store, access a subset of the plurality of device user profiles in the data store based on the subset of the plurality of social circles and the subset of the plurality of mobile devices identified in the request including a presence of the at least one mobile device identified and detected via the short range wireless interface by the mobile device, wherein the subset of the plurality of device user profiles includes one or more user device profiles associated with the one or more mobile devices that are not part of the subset of the plurality of mobile devices identified in the request, determine at least one recommendation for a group activity within the category of group activities based on application of the rules to the subset of the plurality of device user profiles accessed, wherein application of the rules by the communication server comprises performance of analysis of the information to determine an implicit group activity recommendation for each device user profile that does not include an explicit group activity recommendation, and output the at least one recommendation for a group activity to a graphical user interface of the mobile device based on the determination, wherein at least a portion of the analysis component is configured to be executed by a processor on at least one of the mobile device and the communication server, and wherein the at least one recommendation indicates recommendation information but does not identify an individual associated with at least one of the subset of the plurality of device user profiles accessed.

2. The system of claim 1, wherein the analysis component applies the rules to the subset of the plurality of device user profiles by assigning more weight for positive device user profile evaluations than for negative device user profile evaluations.

3. The system of claim 1, wherein the analysis component applies the rules to the subset of the plurality of device user profiles by assigning more weight for device user profile evaluations associated with a current timeframe than for device user profile evaluations associated with a previous timeframe.

4. The system of claim 1, wherein the mobile device is one of a personal computer, a mobile telecommunication device, a mobile handset, a personal digital assistant, a mobile computer, a handheld gaming device, a wireless mobile device, a pager, a portable computer, a tablet computer, a laptop computer, a digital camera, a digital music player, a set-top box, a desktop computer, and a digital calculator.

5. The system of claim 1, wherein the subset of the plurality of device user profiles accessed are based on the degree of separation from each mobile device identified in the request.

6. The system of claim 5, wherein application of the rules by the communication server includes a comparison of the subset of the plurality of device user profiles accessed and determination of a weight for each device user profile based on the degree of separation.

7. The system of claim 1, wherein the communication server accesses more than one device user profile for each mobile device identified in the request based on the subset of the plurality of social circles.

8. The system of claim 1, wherein the short range wireless interface is one of a Bluetooth interface, a wireless personal area network interface, or an IEEE 802.11 compliant wireless interface.

9. A system for blending device-based recommendations, comprising:

a communication server communicatively coupled to a data store and a plurality of mobile devices via a network of a telecommunications provider, the communication server comprising a processor coupled to a non-transitory memory storing a plurality of rules and an analysis component that, upon execution by the processor, configures the communication server to:

track signals transmitted by the plurality of mobile devices and monitor mobile device activity on the plurality of mobile devices, wherein each device user profile for each mobile device is based on the tracked signals transmitted by the mobile device and the monitored mobile device activity on the mobile device, monitor communications sent and received by the plurality of mobile devices, wherein communications being monitored include text messaging, electronic mailing, and digital image communication sent on the network of telecommunication provider, group each of the plurality of mobile devices into one or more social circles of a plurality of social circles based on the monitored communications, receive a request from a mobile device to recommend a group activity for a plurality of individuals corresponding to a subset of the plurality of mobile devices, wherein the request specifies a degree of separation for device user profiles, identifies the subset of the plurality of mobile devices, and identifies a category of group activities for the group activity, and wherein at least one mobile device of the subset of the plurality of mobile devices identified in the request is detected via a short range wireless interface by the mobile device, identify a subset of the plurality of social circles to which any of the subset of the plurality of mobile devices belongs, wherein the subset of the plurality of social circles includes one or more mobile devices that are not part of the subset of the plurality of mobile devices identified in the request, access a subset of a plurality of device user profiles in the data store based on at least the subset of the plurality of social circles and the subset of the plurality of mobile devices identified in the request including a presence of the at least one mobile device identified and detected via the short range wireless interface by the mobile device, wherein the subset of the plurality of device user profiles includes one or more user device profiles associated with the one or more mobile devices that are not part of the subset of the plurality of mobile devices identified in the request, and wherein the subset of the plurality of device user profiles are accessed based on a degree of separation column in each device user profile being within the degree of separation specified in the request, determine an implicit group activity recommendation for each device user profile that does not include an explicit group activity recommendation, determine at least one recommendation for the group activity within the category of group activities based on the subset of the plurality of device user profiles accessed and the implicit group activity recommendation determined by the communication server, and output the at least one recommendation to graphical user interfaces of at least two mobile devices of the subset of the plurality of mobile devices, wherein the at least one recommendation indicates recommendation information but does not identify an individual associated with one of the subset of the plurality of device user profiles accessed.

10. The system of claim 9, wherein the subset of the plurality of device user profiles accessed are based on the degree of separation from each mobile device identified in the request.

11. The system of claim 10, wherein the analysis component further configures the communication server to generate a graphical user interface that includes the at least one recommendation for the group activity, degree of separation information, and weights assigned to each recommendation based on degree of separation information.

12. The system of claim 9, wherein the analysis component further configures the communication server to exchange information with an internet service provider associated with one of the subset of the plurality of mobile devices.

13. The system of claim 9, wherein the analysis component further configures the communication server to generate a graphical user interface that includes the at least one recommendation for the group activity, degree of separation information, and weights assigned to each recommendation based on degree of separation information.

14. The system of claim 9, wherein the tracked signals transmitted by the plurality of mobile devices and the monitored mobile device activity on the plurality of mobile devices indicate at least one of a number of visits to a restaurant or media downloaded and listened to or watched.

15. The system of claim 9, wherein the analysis component further configures the communication server to anticipate another request to recommend a group activity, generate an implicit request for an unsolicited recommendation, and prompt the subset of the plurality of mobile devices with an unsolicited recommendation subsequent to output of the at least one recommendation.

16. A system for blending device-based recommendations, comprising:
 a communication server communicatively coupled to a data store and a plurality of mobile devices via a network of a telecommunications provider, the communication server comprising a processor coupled to a non-transitory memory storing an analysis component that, upon execution by the processor, configures the communication server to:
  track signals transmitted by the plurality of mobile devices and monitor mobile device activity on the plurality of mobile devices, wherein each device user profile for each mobile device is based on the tracked signals transmitted by the mobile device and the monitored mobile device activity on the mobile device,
  monitor communications sent and received by the plurality of mobile devices, wherein communications being monitored include text messaging, electronic mailing, and digital image communication sent on the network of telecommunication provider,
  group each of the plurality of mobile devices into one or more social circles of a plurality of social circles based on the monitored communications,
  receive a request from a mobile device to recommend a group activity for a plurality of individuals corresponding to a subset of the plurality of mobile devices, wherein the request identifies the subset of the plurality of mobile devices and a category of group activities for the group activity, and wherein at least one mobile device identified in the request is detected via a short range wireless interface by the mobile device,
  identify a primary subset of the plurality of social circles to which any of the subset of the plurality of mobile devices belongs, wherein the primary subset of the plurality of social circles includes one or more mobile devices that are not part of the subset of the plurality of mobile devices identified in the request,
  access a plurality of primary device user profiles in the data store based on at least the primary subset of the plurality of social circles and the subset of the plurality of mobile devices identified in the request including a presence of the at least one mobile device that was identified and detected using the short range wireless interface by the mobile device, wherein the plurality of primary device user profiles includes one or more user device profiles associated with the one or more mobile devices that are not part of the subset of the plurality of mobile devices identified in the request,
  identify a secondary subset of the plurality of social circles to which any of the subset of the plurality of mobile devices are associated by one or more degrees of separation specified in the request for device user profiles in the data store,
  access a plurality of secondary device user profiles in the data store based on the secondary subset of the plurality of social circles determine an implicit group activity recommendation for each device user profile that does not include an explicit group activity recommendation, wherein determination of the implicit group activity is based on information from the primary device user profiles and the secondary device user profiles accessed,
  determine at least one recommendation for the group activity within the category of group activities based on the primary plurality of device user profiles accessed, the secondary plurality of device profiles accessed, and the implicit group activity recommendation determined by the communication server, and
  output the at least one recommendation to a graphical user interface of the mobile device, wherein the at least one recommendation indicates recommendation information but does not identify an individual associated with a device user profile that is within the one or more degrees of separation and was used for determination of the at least one recommendation.

17. The system of claim 16, wherein the request specifies a degree of separation permitted between device user profiles, and wherein the implicit group activity recommendation is based on the degree of separation permitted.

18. The system of claim 16, wherein the analysis component further configures the communication server to determine that the subset of the plurality of mobile devices identified in the request have not previously been to geographic locations associated with the category of group activities identified in the request based on the tracked signals transmitted by the plurality of mobile devices.

19. The system of claim 16, wherein the analysis component further configures the communication server to generate a graphical user interface that includes the at least one recommendation for the group activity, degree of separation information, and weights assigned to each recommendation based on degree of separation information.

20. The system of claim 19, wherein the weights assigned to each recommendation is based on the tracked signals transmitted and location history relative to geographic locations associated with the at least one recommendation.

* * * * *